(12) United States Patent
Lörcks et al.

(10) Patent No.: US 6,479,164 B1
(45) Date of Patent: Nov. 12, 2002

(54) METHOD FOR PREPARING COMPOSITE MATERIALS FROM RENEWABLE RAW MATERIALS

(75) Inventors: Jürgen Lörcks, Rees (DE); Winfried Pommeranz, Enger (DE); Kurt Klenke, Kleve (DE); Harald Schmidt, Emmerich (DE); Joachim Heuer, Kranenburg (DE)

(73) Assignee: Biotec Biologische Naturverpackungen GmbH & Co. KG, Emmerich (DE)

(*) Notice: Subject to any disclaimer, the term of this patent is extended or adjusted under 35 U.S.C. 154(b) by 0 days.

(21) Appl. No.: 09/055,552

(22) Filed: Apr. 6, 1998

Related U.S. Application Data

(62) Division of application No. 08/553,574, filed on Feb. 5, 1996, now Pat. No. 5,770,137.

(51) Int. Cl.⁷ .................................................. B27N 3/00
(52) U.S. Cl. ....................................... 428/532; 428/532
(58) Field of Search ............................. 264/122, 109, 264/119; 156/62.2, 312; 428/532

(56) References Cited

U.S. PATENT DOCUMENTS

| | | |
|---|---|---|
| 3,253,978 A | 5/1966 | Bodendorf et al. |
| 3,850,863 A | 11/1974 | Clendinning et al. |
| 4,248,664 A | 2/1981 | Atkinson et al. |
| 4,306,059 A | 12/1981 | Yokobayashi et al. |
| 4,377,440 A | 3/1983 | Gasland |
| 4,508,595 A | 4/1985 | Gasland |
| 4,613,627 A | 9/1986 | Sherman et al. |
| 4,846,932 A | 7/1989 | Karita et al. |
| 5,110,525 A | 5/1992 | Kolsky et al. |
| 5,162,126 A | 11/1992 | Thörner et al. |
| 5,194,206 A | 3/1993 | Koch et al. |
| 5,290,350 A | 3/1994 | Besnard et al. |
| 5,317,037 A | 5/1994 | Golden et al. |
| 5,362,776 A | 11/1994 | Barenberg et al. |
| 5,376,320 A | 12/1994 | Tiefenbacher et al. |
| 5,389,322 A | 2/1995 | Kim et al. |
| 5,470,382 A | 11/1995 | Andou |
| 5,576,049 A | 11/1996 | Haas et al. |

FOREIGN PATENT DOCUMENTS

| | | |
|---|---|---|
| EP | 0 524 920 A1 | 2/1993 |
| GB | 2 050 459 B | 6/1983 |
| JP | 5-246417 | 9/1993 |
| JP | 6-32386 | 2/1994 |
| JP | 6-135487 | 5/1994 |
| WO | WO 94/18384 | 8/1994 |

Primary Examiner—Rich Weisberger
(74) Attorney, Agent, or Firm—Workman, Nydegger & Seeley

(57) ABSTRACT

There is provided a method for preparing composite materials from renewable raw materials wherein natural raw materials, especially in fiber form, comprising starch as binder are molded by adding water in accordance with a predetermined temperature and time profile to form boards and molded articles. The advantages of this method reside in said materials being fully biodegradable and free from harmful substances.

11 Claims, No Drawings

METHOD FOR PREPARING COMPOSITE MATERIALS FROM RENEWABLE RAW MATERIALS

This application is a Divisional Application of application Ser. No. 08/553,574 filed on Feb. 5, 1996, now U.S. Pat. No. 5,790,137 based on International Application PCT/EP94/01737 filed May 27, 1994, claiming priority from German Patent Application No. P 43 17 692.5 filed May 27, 1993.

1. Composite materials made of fibers of renewable raw materials, especially wood fibers which are physically bound by starch-based biodegradable binders and compressed, wherein the binder is a matrix of a dried starch colloid.

2. A method for preparing composite materials made of fibers of renewable raw materials, especially wood fibers which are physically bound by starch-based biodegradable binders and compressed, wherein the fiber materials and a binder containing swellable starch are mixed with water such that the starch is converted into a colloid and, subsequently, the resulting mixture is heated in a heatable press with variable opening side under pressure and dried while the pressure is meanwhile reduced until the desired dimensions are achieved.

3. The method for preparing composite materials made of particles of renewable raw materials, using biodegradable starch-based binders, wherein the curing of the binder and the compression are effected in a physical process by evaporation of water as a function of the distance of the pressing surfaces, the mold pressure, the temperature of the moulded part and the press time.

The invention relates to a method for preparing biodegradable natural fiber materials (wood, textile fibers, paper, etc.) comprising binders from renewable raw materials. Such; methods are gaining more and more importance, for example, in the production of environmentally compatible and formaldehyde-free particle boards.

The majority of composite materials made of wood chips or wood fibers is used in the form of flat boards in the furniture or construction business. Unlike in the paper or textile industry, starch paste is not used at all in the wood industry or merely to serve as extender for synthetic resin glue.

So far, organic binders from basic petrochemical materials have mainly been employed in the production of board-like wood products. Even if only small portions of such synthetic binders are replaced by binders made of renewable raw materials, substantial ecological and macroeconomic advantages will result.

In conventional processes for the production of board-like materials, for example, wood fibers have been prepared by hot-pressing using synthetic binders. The synthetic binders are crosslinked or cured by chemical reactions (polymerization, polyaddition, etc.). During those chemical reactions the wood particles are caused by external pressure to exhibit a degree of compression higher than that corresponding to their bulk density. By curing the synthetic binders, the elastic recovery of the wood particles is reduced. The pressing process is completed when the restoring forces have been fully absorbed by the binders. All conventional methods of preparation have in common that the wood particles are cured prior to the application of glue. Depending on the portion of synthetic binder, a wood chip humidity of 10 to 15% will result after the glue has been applied. Due to the vapor pressure resulting during hot pressing, higher wood chip humidities in conventional preparatory methods will cause tension in the material in excess of the tensile strength in the transverse direction of the board. After the press is opened, the board will crack.

The object underlying the present invention is to provide an environmentally compatible and cost-efficient method for preparing fully biodegradable natural fiber materials free from harmful substances.

This object is achieved by providing the features indicated in the claims.

In achieving the object, the invention is based on the concept of utilizing starch-based binders in the method for preparing fully biodegradable natural fiber materials, coordinating and controlling the procedural steps and selecting a recipe for the amount of binder, water and, if desired, further additives, based on the amount of dry wood chips or wood fibers, thus optimizing the residence time during hot pressing and shaping the mechanical properties of the composite materials prepared in accordance with the desired usage. Preferred starch-based binders include starch that is swellable and which can be converted into a colloid when mixed with water. The humidity of the wood chips used as fibrous material is used as solvent and swelling agent in the production of the natural fiber mixture.

Starch and/or dextrin gums can be economically useful for the preparation of composite materials made of wood chips and wood fibers especially if the necessary procedural requirements are converted to industrial manufacture to enable the preparation of substitutable products in amounts comparable to raw materials for use in synthetic resin binders.

Native starch obtainable from various plants is insoluble in cold water and therefore cannot be used as binder in such state. A chemical and/or physical process is required to impart binding properties to the starch. Irrespective of the process used, the starch is meant to be converted to a colloidal system. Evaporation of the solvent (water) yields a solid matrix that may bond more or less strongly to other substances by adhesion.

Advantageously, the materials, boards, molded articles and profiles based on natural fibers and prepared in accordance with the present invention are made entirely from renewable raw materials. They are biodegradable, completely free from harmful substances (formaldehyde-free) and can also be used for thermal applications.

In the method of the invention the technological parameters during pressing include in particular the press temperature (e.g., 160° C.–220° C.), the mold pressure, the press closing rate, the press time, the nonwoven fabric temperature and the mold phases (supercompression, release, heating period, calibration period).

The technological parameters are optimized relative to the recipe parameters and the properties of the raw materials.

In addition to the press-associated parameters, the amount of water required for the starch to swell is a recipe factor relevant for the press time. Therefore, suitable additives should be added to the binders, causing the water-binder ratio to be reduced, so that it is possible to activate the humidity of the wood as solvent or swelling agent.

The mixture of raw materials is prepared in a suitable mixer, preferably a plough blade mixer with a knife head. All ingredients such as, for example, wood chips, water and starch flour are placed in the mixer as prescribed. After sufficient mixing, the mixture is placed in a mold, compressed for a short time, covered and placed in a heatable press. The cake is then molded using a special method at a predetermined temperature and released from the mold to form the finished board. Thus, fiber composite boards having various mechanical properties can be produced.

Additionally, plywood or decorated boards can be placed in the mold and pressed onto the fiber composite boards.

Also, the mixture of raw materials can be molded by extruders comprising suitable dies and, if desired, pressed onto the aforementioned boards by extrusion.

If binders from renewable raw materials (e.g., starch) are used, the binding process will not be the result of a chemical reaction. The curing of the natural binders is a physical process initiated by evaporation of water. Curing increases as drying proceeds. Such characteristic difference between natural binders and reactive, synthetic binders requires a completely different method that deviates substantially from conventional preparatory processes.

Embodiments of the method of the invention are shown below.

EXAMPLE 1

1,760 g of medium-fine wood chips were placed in a 130 liter plough blade mixer with a knife head and sprayed with 520 g of water. Then 520 g of potato starch were added and mixed for one more minute.

Of this mixture, 50% was removed and uniformly sprinkled on a metal sheet in a 420×420 mm (inner size) frame. The bulk was compressed at a force of 700 N for a short time. The thus obtained cake was covered with a further metal sheet and placed in a heatable press.

The cake was compressed at a press temperature of 170° C. for two seconds to a level of 10 mm. The mold pressure was maintained at 0.1 N/mm$^2$ for 20 minutes. The distance between the pressing surfaces was adjusted to 10 mm for one minute. Then the mold was released and the finished board removed.

The laboratory experiments led to the following results:
Bulk density 530 g/l
Flexural strength 18 N/mm$^2$

EXAMPLE 2

1,760 g of medium-fine wood chips were placed in a 130 liter plough blade mixer with a knife head and sprayed with 520 g of water. Then 520 g of corn starch were added and mixed for one more minute.

Of this mixture, 50% was removed and uniformly sprinkled on a metal sheet in a 420×420 mm (inner size) frame. The bulk was compressed at a force of 700 N for a short time. The thus obtained cake was covered with a further metal sheet and placed in a heatable press.

The cake was compressed at a press temperature of 170° C. for two seconds to a level of 10 mm. The mold pressure was maintained at 0.1 N/mm$^2$ for 20 min. The distance between the pressing surfaces was adjusted to 10 mm for one minute. Then the mold was released and the finished board removed.

The laboratory experiments led to the following results:
Bulk density 546 g/l
Flexural strength 14 N/mm$^2$

EXAMPLE 3

1,760 g of medium-fine wood chips were placed in a 130 liter plough blade mixer with a knife head and sprayed with 520 g of water. Then 520 g of cationic wheat starch were added and mixed for one more minute.

Of this mixture, 50% was removed and uniformly sprinkled on a metal sheet in a 420×420 mm (inner size) frame. The bulk was compressed at a force of 700 N for a short time. The thus obtained cake was covered with a further metal sheet and placed in a heatable press.

The cake was compressed at a press temperature of 170° C. for two seconds to a level of 10 mm. The mold pressure was maintained at 0.1 N/mm$^2$ for 20 minutes. The distance between the pressing surfaces was adjusted to 10 mm for one minute. Then the mold was released and the finished board removed.

The laboratory experiments led to the following results:
Bulk density 528 g/l
Flexural strength 21 N/mm$^2$

EXAMPLE 4

1,760 g of fine wood chips were placed in a 130 liter plough blade mixer with a knife head and sprayed with 520 g of water. Then 520 g of potato starch were added and mixed for one more minute. 1,760 g of coarse wood chips were placed in a 130 liter plough blade mixer with a knife head and sprayed with 520 g of water. Then 520 g of. potato starch were added and mixed for one more minute.

Of each mixture, 25% was removed and sprinkled on a metal sheet in a 420×420 mm (inner size) frame as follows: at first, one half of the fine wood chips, then the coarse wood chips and finally the other half of the fine wood chips. The bulk was compressed at a force of 700 N for a short time. The thus obtained cake was covered with a further metal sheet and placed in a heatable press.

The cake was compressed at a press temperature of 170° C. for two seconds to a level of 11 mm. The mold pressure was maintained at 0.1 N/mm$^2$ for 14 minutes. The distance between the pressing surfaces was adjusted to 10 mm for one minute. Then the mold was released and the finished board removed.

The laboratory experiments led to the following results:
Bulk density 525 g/l
Flexural strength 19 N/mm$^2$

EXAMPLE 5

1,760 g of medium-fine wood chips were placed in a 130 liter plough blade mixer with a knife head and sprayed with 520 g of water. Then 520 g of wheat starch were added and mixed for one more minute.

Of this mixture, 50% was removed and uniformly sprinkled on a metal sheet in a 420×420 mm (inner size) frame as follows:

At first, a 3 mm base layer, then 100 g of water, next the remaining mixture and finally 100 g of water were sprayed onto the sheet. The bulk was compressed at a force of 700 N for a short time. The thus obtained cake was covered with a further metal sheet and placed in a heatable press.

The cake was compressed at a press temperature of 190° C. for 20 seconds to a level of 9.5 mm. The distance between the pressing surfaces was maintained at 12.5 mm for 12 minutes. Next, the distance between the pressing surfaces was adjusted to 10 mm for three minutes. Then the mold was released and the finished board removed.

The laboratory experiments led to the following results:
Bulk density 551 g/l
Flexural strength 17 N/mm$^2$

What is claimed is:

1. A composite article comprising fibers of renewable material physically bound by a starch-based biodegradable binder, wherein said starch-based biodegradable binder is a physically cured matrix of a dried colloid of a swellable starch.

2. A composite article as defined in claim 1 wherein said composite article comprising a board.

3. A composite article as defined in claim 1 wherein the composite article comprises a molded article.

4. A composite article as defined in claim 1 wherein the fibers of renewable raw material comprise wood fibers.

5. A composite article as defined in claim 1 wherein the composite article comprises an extruded article.

6. A composite article as defined in claim 1 wherein the starch of the starch-based biodegradable binder comprises native starch in natural or hybrid form derived from the group consisting of potatoes, manoic, corn, wax corn, corn with high amylose content, grain flours, physically modified starch and chemically modified starch.

7. A composite article as defined in claim 1 wherein the fibers are fibers of plant-based raw materials selected from the group consisting of lignocellulose, wood, wood chips, and cotton.

8. A composite article as defined in claim 1 wherein the composite article comprises a nonwoven fabric.

9. A composite article is defined in claim 1 wherein the composite article is formed by heating a mixture comprising fibers, water, and the starch-based biodegradable binder in order to evaporate the water therefrom and form the cured starch binder matrix.

10. A molded composite article of manufacture comprising fibers of a renewable material dispersed throughout and bound together by a starch-based biodegradable binder matrix formed by blending together the starch-based biodegradable binder, water, and fibers and heating the resulting mixture in order to evaporate water therefrom to form the starch-based biodegradable binder matrix.

11. A molded composite article of manufacture as defined in claim 9 wherein the molded composite article comprises a board.

* * * * *

UNITED STATES PATENT AND TRADEMARK OFFICE
CERTIFICATE OF CORRECTION

PATENT NO.    : 6,479,164 B1
DATED         : November 12, 2002
INVENTOR(S)   : Lörcks et al.

It is certified that error appears in the above-identified patent and that said Letters Patent is hereby corrected as shown below:

Column 1,
Line 36, before "methods" change "Such;" to -- Such --

Signed and Sealed this

Eleventh Day of March, 2003

JAMES E. ROGAN
*Director of the United States Patent and Trademark Office*